US012781026B2

(12) United States Patent
Aoki et al.

(10) Patent No.: US 12,781,026 B2
(45) Date of Patent: Nov. 3, 2026

(54) FIBROUS CELLULOSE-CONTAINING MATERIAL, FIBROUS CELLULOSE COMPOSITE RESIN, AND METHOD FOR PREPARING FIBROUS CELLULOSE-CONTAINING MATERIAL

(71) Applicant: DAIO PAPER CORPORATION, Ehime (JP)

(72) Inventors: Ryunosuke Aoki, Ehime (JP); Ikko Matsusue, Ehime (JP); Takaaki Imai, Ehime (JP)

(73) Assignee: Daio Paper Corporation, Ehime (JP)

( * ) Notice: Subject to any disclaimer, the term of this patent is extended or adjusted under 35 U.S.C. 154(b) by 441 days.

(21) Appl. No.: 18/548,403

(22) PCT Filed: Jan. 18, 2022

(86) PCT No.: PCT/JP2022/001498

§ 371 (c)(1),
(2) Date: Aug. 30, 2023

(87) PCT Pub. No.: WO2022/209157

PCT Pub. Date: Oct. 6, 2022

(65) Prior Publication Data

US 2024/0150557 A1 May 9, 2024

(30) Foreign Application Priority Data

Mar. 31, 2021 (JP) ................................ 2021-060743

(51) Int. Cl.

*C08L 1/02* (2006.01)
*C08B 15/06* (2006.01)
*C08L 23/14* (2006.01)

(52) U.S. Cl.

CPC ................ *C08L 1/02* (2013.01); *C08B 15/06* (2013.01); *C08L 23/142* (2013.01); *C08L 2205/16* (2013.01)

(58) Field of Classification Search

CPC .... C08B 15/06; C08L 1/00; C08L 1/08; C08J 2323/12; C08J 2401/02; C08J 2401/10; C08J 3/005; C08J 2423/26

See application file for complete search history.

(56) References Cited

U.S. PATENT DOCUMENTS

2020/0115471 A1* 4/2020 Tsujii .................... C08L 101/00
2022/0049071 A1* 2/2022 Matsusue .............. C08L 101/00
2022/0135781 A1 5/2022 Matsusue et al.
2022/0219358 A1* 7/2022 Suzuki .................... B29C 44/58
2022/0282076 A1 9/2022 Matsusue et al.

FOREIGN PATENT DOCUMENTS

JP 2000-505135 4/2000
JP 2010-106251 5/2010
JP 2016-222786 12/2016
JP 2019-001876 1/2019
JP 2019001876 A * 1/2019 ............. C08B 15/06
JP 2021-037769 3/2021
WO 2014/087767 6/2014
WO 2015/198218 12/2015
WO 2017/094812 6/2017
WO 2019/221256 11/2019
WO 2020/090711 5/2020
WO WO-2020090711 A1 * 5/2020 ................ C08L 1/02
WO 2020/203147 10/2020
WO WO-2020213457 A1 * 10/2020 ......... B29C 44/3446
WO 2021/039706 3/2021
WO 2021193120 A1 9/2021
WO 2021256247 A1 12/2021

OTHER PUBLICATIONS

Peng, et al. "Maleic anhydride polypropylene modified cellulose nanofibril polypropylene nanocomposites with enhanced strength." Polymer Composites,37(3), 782-793, Feb. 13, 2016. (Year: 2016).*
International Search Report for PCT/JP2022/001498, dated Apr. 12, 2022.
Extended European Search Report for EP Patent Application No. 22779389.0, dated Feb. 7, 2025.

* cited by examiner

*Primary Examiner* — Christopher M Rodd
(74) *Attorney, Agent, or Firm* — Andrus Intellectual Property Law, LLP

(57) ABSTRACT

A fibrous cellulose-containing material having excellent dispersibility even when dried, a method for preparing the same, and a fibrous cellulose composite resin having excellent strength. The fibrous cellulose-containing material is for addition to resin, and contains fibrous cellulose having an average fiber width of 0.1 to 19 μm and having hydroxyl groups partially or fully substituted with carbamate groups, and interactive powder that is interactive with the fibrous cellulose. The fibrous cellulose composite resin contains the fibrous cellulose-containing material as fibrous cellulose. The method for preparing a fibrous cellulose-containing material includes defibrating fibrous cellulose having hydroxyl groups partially or fully substituted with carbamate groups to have an average fiber width of 0.1 to 19 μm, and mixing with interactive powder that is interactive with the fibrous cellulose to obtain a mixed liquid, and drying the mixed liquid.

9 Claims, No Drawings

FIBROUS CELLULOSE-CONTAINING MATERIAL, FIBROUS CELLULOSE COMPOSITE RESIN, AND METHOD FOR PREPARING FIBROUS CELLULOSE-CONTAINING MATERIAL

CROSS-REFERENCE TO RELATED APPLICATIONS

This application is the U.S. national stage application of International Application PCT/JP2022/001498, filed Jan. 18, 2022, which international application was published on Oct. 6, 2022, as International Publication WO 2022/209157 in the Japanese language. The International Application claims priority of Japanese Patent Application No. 2021-060743, filed Mar. 31, 2021. The international application and Japanese application are both incorporated herein by reference, in entirety.

FIELD OF ART

The present invention relates to a fibrous cellulose-containing material, a fibrous cellulose composite resin, and a method for preparing a fibrous cellulose-containing material.

BACKGROUND ART

Fine fibers like cellulose nanofibers and microfiber cellulose (microfibrillated cellulose) have recently been attracting attention for their application to reinforcing materials for resins. However, fine fibers are hydrophilic, whereas resins are hydrophobic, so that fine fibers, for use as a reinforcing material for resins, have problems with dispersibility. In view of this, the present inventors have proposed to substitute the hydroxyl groups of fine fibers with carbamate groups (see Patent Publication 1). According to this proposal, dispersibility of the fine fibers are improved, which enhances reinforcing effect on resins. However, fine fibers aggregate upon drying, which is firm, so that use of dried fine fibers as a reinforcing material for resins imposes problems with dispersibility.

PRIOR ART PUBLICATION

Patent Publication

Patent Publication 1: JP 2019-001876 A

SUMMARY OF THE INVENTION

Problem to be Solved by the Invention

It is a primary object of the present invention to provide a fibrous cellulose-containing material having excellent dispersibility even when dried, a method for preparing the same, and a fibrous cellulose composite resin having excellent strength.

Means for Solving the Problem

Conventional researches, such as those disclosed in the above-mentioned patent publication, have focused on dispersibility of fine fibers when stored in dispersion, and it has found out that, among various modifications, such as esterification, etherification, amidation, and sulfidation, introduction of carbamate groups (carbamation) is superior. In contrast, the present invention focuses on dispersibility of fine fibers upon mixing with resin, following drying of the fine fibers in advance or the like, and through various experiments conducted on the premise of introduction of carbamate groups, it has found out that the above problems may be solved by pursuing additional substances or properties to be used with fine fibers, to achieve the present invention. The means achieved in this way are as follows.

<Means Recited in Claim 1>

A fibrous cellulose-containing material for addition to resin, containing:

- fibrous cellulose having an average fiber width of 0.1 to 19 μm and having hydroxyl groups partially or fully substituted with carbamate groups, and
- interactive powder that is interactive with the fibrous cellulose.

<Means Recited in Claim 2>

The fibrous cellulose-containing material according to claim 1,

- wherein a ratio of 90% particle size of the interactive powder to 10% particle size of the interactive powder is 2 to 1000.

<Means Recited in Claim 3>

The fibrous cellulose-containing material according to claim 1 or 2,

- wherein the interactive powder has a volume average particle size of 0.01 to 10000 μm, and a ratio of the volume average particle size in micrometer of the interactive powder to an average fiber length in micrometer of the fibrous cellulose is 0.005 to 5000.

<Means Recited in Claim 4>

The fibrous cellulose-containing material according to any one of claims 1 to 3,

- wherein 5% or more of the fibrous cellulose has a fiber length below 0.2 mm, and 10% or more of the fibrous cellulose has a fiber length of 0.2 to 0.6 mm.

<Means Recited in Claim 5>

The fibrous cellulose-containing material according to any one of claims 1 to 4,

- wherein the fibrous cellulose has an average fiber length of 1.0 mm or shorter, an average fiber width of 10 μm or shorter, and a percentage of fibrillation of 2.5% or higher.

<Means Recited in Claim 6>

The fibrous cellulose-containing material according to any one of claims 1 to 5,

- wherein the interactive powder is acid-modified resin powder having an acid value of 2.0% or higher.

<Means Recited in Claim 7>

The fibrous cellulose-containing material according to any one of claims 1 to 6,

- wherein the interactive powder is maleic anhydride-modified polypropylene powder.

<Means Recited in Claim 8>

A fibrous cellulose composite resin containing fibrous cellulose and resin mixed together,

- wherein the fibrous cellulose is the fibrous cellulose-containing material according to any one of claims 1 to 7.

<Means Recited in Claim 9>

A method for preparing a fibrous cellulose-containing material, including:

- defibrating fibrous cellulose having hydroxyl groups partially or fully substituted with carbamate groups to have an average fiber width of 0.1 to 19 μm, and mixing with interactive powder that is interactive with the fibrous cellulose to obtain a mixed liquid, and
- drying the mixed liquid.

Effect of the Invention

According to the present invention, there are provided a fibrous cellulose-containing material having excellent dispersibility even when dried, a method for preparing the same, and a fibrous cellulose composite resin having excellent strength.

MODE FOR CARRYING OUT THE INVENTION

Next, embodiments for carrying out the present invention will be discussed. The embodiments are mere examples of the present invention, and the scope of the present invention is not limited by the scopes of the present embodiments.

The fibrous cellulose-containing material according to the present embodiment is for addition to resin, and contains fibrous cellulose (referred to also as cellulose fibers hereinbelow) having an average fiber width of 0.1 to 19 μm, and having hydroxyl groups (—OH) partially or fully substituted with carbamate groups, i.e., carbamate-modified microfiber cellulose. In addition, the fibrous cellulose-containing material also contains powder that is interactive with the fibrous cellulose (referred to also simply as interactive powder hereinbelow). This powder is preferably formed of acid-modified resin, of which acid radicals are ionically bonded to part or all of the carbamate groups. Further, by adding this fibrous cellulose-containing material to resin, a fibrous cellulose composite resin may be obtained. In the method for preparing a fibrous cellulose-containing material, fibrous cellulose having hydroxyl groups partially or fully substituted with carbamate groups is defibrated to have an average fiber width of 0.1 to 19 μm, and mixed with powder that is interactive with the fibrous cellulose to obtain a mixed liquid, and this mixed liquid is dried. Detailed discussion is made below.

<Fibrous Cellulose>

The fibrous cellulose, which refers to fine fibers according to the present embodiment, is microfiber cellulose (microfibrillated cellulose) having an average fiber diameter of 0.1 to 19 μm. With the fibrous cellulose being microfiber cellulose, reinforcing effect on resins is significantly enhanced. Further, microfiber cellulose is more easily modified with carbamate groups (carbamated) compared to cellulose nanofibers, which are also fine fibers. Note that it is more preferred to subject a cellulose raw material to carbamation before it is made finer. In this regard, microfiber cellulose and cellulose nanofibers are equivalent.

According to the present embodiment, the microfiber cellulose refers to fibers having a larger average fiber width than that of cellulose nanofibers. Specifically, the microfiber cellulose has an average fiber diameter (width) of, for example, 0.1 to 19 μm, preferably 0.2 to 10 μm, more preferably larger than 0.5 to 10 μm. With an average fiber diameter below (less than) 0.1 μm, the fibrous cellulose differs nothing from cellulose nanofibers, and sufficient effect to enhance resin strength (in particular, flexural modulus) may not be obtained. Also, a longer time is required for defibration, which in turn requires more energy. Further, dewaterability of a cellulose fiber slurry is impaired. With such an impaired dewaterability, a high amount of energy is required for drying, which in turn may cause thermal deterioration of the fibrous cellulose to impair its strength. In addition, if the fibrous cellulose is defibrated to have an average fiber diameter below 0.1 μm, variation in fiber length of the fibrous cellulose is smaller, so that the advantage of the present embodiment, in which the particle size distribution of the interactive powder is defined, is hard to be exhibited.

On the other hand, with an average fiber diameter over (exceeding) 19 μm, the fibrous cellulose differs nothing from pulp, and sufficient reinforcing effect may not be obtained. In addition, through defibration resulting merely in an average fiber diameter over 19 μm, variation in fiber length of the fibrous cellulose is smaller, so that the advantage of the present embodiment, in which the particle size distribution of the interactive powder is defined, is hard to be exhibited. In contrast, with an average fiber diameter of 10 μm or smaller, the fibrous cellulose entangles with the interactive powder better, in combination with an average fiber length of 1.0 mm or shorter and a percentage of fibrillation of 2.5% or higher.

The mode for the diameter (width) of the fibrous cellulose is preferably 0.1 to 19 μm, more preferably 0.5 to 10 μm, particularly preferably 1 to 6 μm. In this regard, according to the present embodiment in which variation in fiber length of the fibrous cellulose is wider as will be discussed later, since a certain percentage of fibers has a larger fiber width in the process of defibration, it is more appropriate to specify the fibrous cellulose by the diameter of the highest number of fibers, i.e., the mode for the diameter, rather than by the average of fiber diameters. In this light, with the mode for the diameter of the fibrous cellulose less than 0.1 μm, the percentage of cellulose nanofibers tends to be higher, which may result in aggregation of cellulose nanofibers and consequently, insufficient reinforcing effect. On the other hand, with the mode for the diameter of the fibrous cellulose over 19 μm, the percentage of pulp tends to be higher, which may also result in insufficient reinforcing effect.

The average fiber diameter of fine fibers (microfiber cellulose and cellulose nanofibers) is measured as follows.

First, 100 ml of an aqueous dispersion of fine fibers having a solid concentration of 0.01 to 0.1 mass % is filtered through a TEFLON (registered trademark) membrane filter, and subjected to solvent substitution once with 100 ml of ethanol and three times with 20 ml of t-butanol. Then the resulting mass is lyophilized and coated with osmium to obtain a sample. An electron microscopic SEM image of this sample is observed at a magnification of 3000 to 30000 folds, depending on the width of the constituent fibers. Specifically, two diagonal lines are drawn on the observation image, and three arbitrary straight lines passing the intersection of the diagonals are drawn. Then, the widths of a total of 100 fibers crossing these three straight lines are visually measured. The median diameter of the measured values is taken as the average fiber diameter.

Further, the mode for the diameter of fine fibers is determined using a fiber analyzer FS5 manufactured by VALMET K.K.

Incidentally, when the fibrous cellulose is microfiber cellulose, the fiber length or the like of the fibers characteristically varies widely for the following reasons.

First, pulp is produced by, for example, wood chips being cooked in alkali under pressure and then naturally loosened upon returning to ordinary pressure, and thus without undergoing any mechanical defibration. Wood cells are merely separated as they are to become pulp, and accordingly the fiber lengths are relatively uniform. Cellulose nanofibers are mostly fibers which are independent fluff separated from microfiber cellulose. Thus the fiber lengths are relatively uniform. In contrast, microfiber cellulose is in the process of causing pulp to become fluff under mechanical defibrating force, so that the distribution of fiber length or the like is wider.

Usually, fibrous cellulose having a fiber length below 0.2 mm accounts for 5% or more of all the fibrous cellulose and the fibrous cellulose having a fiber length of 0.2 to 0.6 mm accounts for 10% or more of all the fibrous cellulose, preferably fibrous cellulose having a fiber length below 0.2 mm accounts for 8% or more of all the fibrous cellulose and the fibrous cellulose having a fiber length of 0.2 to 0.6 mm accounts for 13% or more of all the fibrous cellulose, more preferably fibrous cellulose having a fiber length below 0.2 mm accounts for 20% or more of all the fibrous cellulose and the fibrous cellulose having a fiber length of 0.2 to 0.6 mm accounts for 16% or more of all the fibrous cellulose. With microfiber cellulose having such wide variation in fiber length, the advantage of the present embodiment, in which the particle size distribution of the interactive powder is defined, may fully be exhibited.

In this regard, at too high a percentage of fibers having a fiber length below 0.2 mm, the microfiber cellulose may not be entangled sufficiently with the interactive powder having a larger particle size, leading to a lower dispersibility. At too high a percentage of fibers having a fiber length over 0.6 mm, the microfiber cellulose may not be entangled sufficiently with the interactive powder having a smaller particle size, leading to a lower dispersibility.

As discussed above, though the variation in fiber length or the like of the microfiber cellulose is relatively wide, too high a percentage of fibers having a fiber length below 0.2 mm or too high a percentage of fibers having a fiber length over 0.6 mm may deteriorate the reinforcing effect as the fibers per se on resins. Thus, the fibrous cellulose having a fiber length of 0.2 to 0.6 mm accounts for 10 to 90%, more preferably 14 to 70%, particularly preferably 16 to 50% of all the fibrous cellulose. With less than 14% of the fibrous cellulose having a fiber length of 0.2 to 0.6 mm, the fibrous cellulose may be entangled with the interactive powder insufficiently, so that the reinforcing effect may not be produced fully.

The microfiber cellulose may be obtained by defibrating (making finer) a cellulose raw material (referred to also as raw material pulp hereinbelow). As the raw material pulp, one or more members may be selected and used from the group consisting of, for example, wood pulp made from hardwood, softwood, or the like; non-wood pulp made from straw, bagasse, cotton, hemp, bast fibers, or the like; and de-inked pulp (DIP) made from recovered used paper, waste paper, or the like. These various raw materials may be in the form of a ground product (powdered product), such as those referred to as cellulose-based powder.

In this regard, however, the raw material pulp is preferably wood pulp in order to avoid contamination of impurities as much as possible. As the wood pulp, one or more members may be selected and used from the group consisting of, for example, chemical pulp, mechanical pulp (TMP) and the like, such as hardwood kraft pulp (LKP), softwood kraft pulp (NKP), and the like.

The hardwood kraft pulp may be hardwood bleached kraft pulp, hardwood unbleached kraft pulp, or hardwood semi-bleached kraft pulp. Similarly, the softwood kraft pulp may be softwood bleached kraft pulp, softwood unbleached kraft pulp, or softwood semi-bleached kraft pulp.

As the mechanical pulp, one or more members may be selected and used from the group consisting of, for example, stone ground pulp (SGP), pressurized stone ground pulp (PGW), refiner ground pulp (RGP), chemi-ground pulp (CGP), thermo-ground pulp (TGP), ground pulp (GP), thermomechanical pulp (TMP), chemithermomechanical pulp (CTMP), refiner mechanical pulp (RMP), and bleached thermomechanical pulp (BTMP).

The raw material pulp may be pretreated by a chemical method prior to defibration. Such pretreatment by a chemical method may be, for example, hydrolysis of polysaccharides with acid (acid treatment), hydrolysis of polysaccharides with enzyme (enzyme treatment), swelling of polysaccharides with alkali (alkali treatment), oxidation of polysaccharides with an oxidizing agent (oxidation treatment), or reduction of polysaccharides with a reducing agent (reduction treatment). Among these, as a pretreatment by a chemical method, enzyme treatment is preferred, and more preferred is one or more treatments selected from acid treatment, alkali treatment, and oxidation treatment, in addition to the enzyme treatment. The enzyme treatment is discussed in detail below.

As an enzyme used in the enzyme treatment, preferably at least one of, more preferably both of cellulase enzymes and hemicellulase enzymes are used. With such enzymes, defibration of the cellulose raw material is more facilitated. It is noted that cellulase enzymes cause degradation of cellulose in the presence of water, whereas hemicellulase enzymes cause degradation of hemicellulose in the presence of water.

The cellulase enzymes may be enzymes produced by, for example, the genus *Trichoderma* (filamentous fungus), the genus *Acremonium* (filamentous fungus), the genus *Aspergillus* (filamentous fungus), the genus *Phanerochaete* (basidiomycete), the genus *Trametes* (basidiomycete), the genus *Humicola* (filamentous fungus), the genus *Bacillus* (bacteria), the genus *Schizophyllum* (bacteria), the genus *Streptomyces* (bacteria), and the genus *Pseudomonas* (bacteria). These cellulase enzymes are available as reagents or commercial products. Examples of the commercial products may include, for example, Cellulosin T2 (manufactured by HBI ENZYMES INC.), Meicelase (manufactured by MEIJI SEIKA PHARMA CO., LTD.), Novozyme 188 (manufactured by NOVOZYMES), Multifect CX10L (manufactured by GENENCOR), and cellulase enzyme GC220 (manufactured by GENENCOR).

The cellulase enzymes may also be either EG (endoglucanase) or CBH (cellobiohydrolase). EG and CBH may be used alone or in mixture, or further in mixture with hemicellulase enzymes.

The hemicellulase enzymes may be, for example, xylanase, which degrades xylan; mannase, which degrades mannan; or arabanase, which degrades araban. Pectinase, which degrades pectin, may also be used.

Hemicellulose is a polysaccharide other than pectin, which is present among cellulose microfibrils of plant cell walls. Hemicellulose has numeral varieties and varies depending on the kinds of wood and among cell wall layers. Glucomannan is a major component in the secondary walls of softwood, whereas 4-O-methylglucuronoxylan is a major component in the secondary walls of hardwood. Thus, use of mannase is preferred for obtaining fine fibers from softwood bleached kraft pulp (NBKP), whereas use of xylanase is preferred for obtaining fine fibers from hardwood bleached kraft pulp (LBKP).

The amount of the enzyme to be added to the cellulose raw material may depend on, for example, the kind of enzyme, the kind of wood (either softwood or hardwood) used as a raw material, or the kind of mechanical pulp. The amount of the enzyme to be added may preferably be 0.1 to 3 mass %, more preferably 0.3 to 2.5 mass %, particularly preferably 0.5 to 2 mass %, of the amount of the cellulose raw material. With the amount of the enzyme below 0.1 mass %, sufficient effect due to the addition of the enzyme may not be obtained. With the amount of the enzyme over 3 mass %, cellulose may be saccharified to lower the yield of the fine fibers. A problem also resides in that improvement in effect worth the increased amount to be added may not be observed.

When a cellulase enzyme is used as the enzyme, the enzyme treatment is preferably carried out at a pH in a weakly acidic region (pH=3.0 to 6.9) in view of the enzymatic reactivity. On the other hand, when a hemicellulase enzyme is used as the enzyme, the enzyme treatment is preferably carried out at a pH in a weakly alkaline region (pH=7.1 to 10.0).

Irrespective of whether a cellulase enzyme or a hemicellulase enzyme is used, the enzyme treatment is carried out at a temperature of preferably 30 to 70° C., more preferably 35 to 65° C., particularly preferably 40 to 60° C. At a temperature of 30° C. or higher, the enzymatic activity is hard to be lowered, and prolongation of the treatment time may be avoided. At a temperature of 70° C. or lower, enzyme inactivation may be avoided.

The duration of the enzyme treatment may depend on, for example, the type of the enzyme, the temperature in the enzyme treatment, and the pH in the enzyme treatment. Generally, the duration of the enzyme treatment is 0.5 to 24 hours.

After the enzyme treatment, the enzyme is preferably inactivated. Inactivation of enzymes may be effected by, for example, addition of an alkaline aqueous solution (preferably at pH 10 or higher, more preferably at pH 11 or higher) or addition of 80 to 100° C. hot water.

Next, the alkali treatment is discussed.

Alkali treatment prior to the defibration causes partial dissociation of hydroxyl groups in hemicellulose or cellulose in pulp, resulting in anionization of the molecules, which weakens intra- and intermolecular hydrogen bonds to promote dispersion of the cellulose raw material during the defibration.

As the alkali used in the alkali treatment, for example, sodium hydroxide, lithium hydroxide, potassium hydroxide, an aqueous ammonia solution, or organic alkali, such as tetramethylammonium hydroxide, tetraethylammonium hydroxide, tetrabutylammonium hydroxide, and benzyltrimethylammonium hydroxide may be used. In view of the manufacturing cost, sodium hydroxide is preferably used.

The enzyme treatment, acid treatment, or oxidation treatment prior to the defibration may result in a low water retention, a high degree of crystallinity, and also high homogeneity of the microfiber cellulose. In this regard, microfiber cellulose at a lower water retention is easily dewatered, so that dewaterability of a cellulose fiber slurry may be improved.

The enzyme treatment, acid treatment, or oxidation treatment of the raw material pulp causes decomposition of the amorphous region of hemicellulose and cellulose in pulp, which leads to reduction of energy required for the defibration and to improvement in uniformity and dispersibility of the cellulose fibers. The pretreatment, however, lowers the aspect ratio of microfiber cellulose, and it is thus preferred to avoid excessive pretreatment for the purpose of using the microfiber cellulose as a reinforcing material for resins.

The defibration of the raw material pulp may be performed by beating the raw material pulp in, for example, beaters, homogenizers, such as high-pressure homogenizers and high-pressure homogenizing apparatus, millstone friction machines, such as grinders and mills, single-screw kneaders, multi-screw kneaders, kneaders, refiners, and jet mills. It is preferred to use refiners or jet mills.

The average fiber length (average of lengths of single fibers) of the microfiber cellulose is preferably 0.10 to 2.00 mm, more preferably 0.12 to 1.50 mm, particularly preferably 0.15 to 1.00 mm. With an average fiber length below 0.10 mm, the microfiber cellulose may not be able to form three dimensional networks among them, resulting in low reinforcing effect (in particular, flexural modulus) of the resulting composite rein. Further, the microfiber cellulose may not be entangled sufficiently with the interactive powder. With an average fiber length over 2.00 mm, the length of the microfiber cellulose differs nothing from that of the raw material pulp, so that the reinforcing effect may not be sufficient. Further, the fibers may aggregate and may not be entangled sufficiently with the interactive powder.

The average fiber length of the cellulose raw material, which is a raw material of microfiber cellulose, is preferably 0.50 to 5.00 mm, more preferably 1.00 to 3.00 mm, particularly preferably 1.50 to 2.50 mm. With an average fiber length of the cellulose raw material below 0.50 mm, reinforcing effect on resins after defibration may not be sufficient. With an average fiber length over 5.00 mm, manufacturing cost in defibration may be disadvantageous.

The average fiber length of the microfiber cellulose may arbitrarily be adjusted by, for example, selection, pretreatment, or defibration of the raw material pulp.

The aspect ratio of the microfiber cellulose is preferably 2 to 15000, more preferably 10 to 10000. With an aspect ratio below 2, the microfiber cellulose may not be able to form three dimensional networks among them, resulting in poor reinforcing effect even with an average fiber length of 0.10 mm or longer. Further with the aspect ratio below 2, the microfiber cellulose may have too small a number of points to interact with the interactive powder, which is in a spherical shape, so that sufficient interaction may not be achieved, failing to produce sufficient effect in making the interactive powder and the fibers compatible, which results in insufficient reinforcing effect. With an aspect ratio over 15000, the microfiber cellulose tends to be highly entangled, which may lead to insufficient dispersion in the resin. Further, the fibers themselves are interacted with each other, and interaction with the interactive powder may not be sufficient, resulting in insufficient reinforcing effect.

The aspect ratio is a value obtained by dividing the average fiber length by the average fiber width. A larger aspect ratio causes a larger number of locations to be caught, which enhances the reinforcing effect but, as such, is assumed to result in lower ductility of the resin.

The percentage of fibrillation of the microfiber cellulose is preferably 1.0 to 30.0%, more preferably 1.5 to 20.0%, particularly preferably 2.5 to 15.0%. With a percentage of fibrillation over 30.0%, the area of contact with water is too large, which may make the dewatering difficult even when the defibration results in the average fiber width within a range of 0.1 μm or larger. Further with the percentage of fibrillation over 30.0%, the surface area of the microfiber cellulose is too large, which makes it easier for the fibers to retain water, so that the interaction with the interactive powder may be difficult. With a percentage of fibrillation below 1.0%, the hydrogen bonding between the fibrils may be too little to form firm three dimensional networks. With a percentage of fibrillation below 2.5%, the microfiber cellulose may tend to be entangled with the interactive powder poorly.

The fiber length or the percentage of fibrillation of fibers is determined using a fiber analyzer FS5 manufactured by Valmet K.K.

The degree of crystallinity of the microfiber cellulose is preferably 50% or higher, more preferably 55% or higher, particularly preferably 60% or higher. With a degree of crystallinity below 50%, the mixability with other cellulose fibers, for example, pulp or cellulose nanofibers, may be improved, whereas the strength of the fibers per se may be lowered to make it difficult to enhance the strength of resins. On the other hand, the degree of crystallinity of the microfiber cellulose is preferably 95% or lower, more preferably 90% or lower, particularly preferably 85% or lower. With a degree of crystallinity over 95%, the ratio of firm hydrogen bonding within the molecules is high, which makes the fibers themselves rigid and impairs dispersibility.

The degree of crystallinity of the microfiber cellulose may arbitrarily be adjusted by, for example, selection, pretreatment, or making finer of the raw material pulp.

The degree of crystallinity refers to a value determined in accordance with JIS K 0131 (1996).

The pulp viscosity of the microfiber cellulose is preferably 2 cps or higher, more preferably 4 cps or higher. With a pulp viscosity of the microfiber cellulose below 2 cps, control of aggregation of the microfiber cellulose may be difficult. Further with the pulp viscosity below 2 cps, the microfiber cellulose may interact with the interactive powder but result in insufficient reinforcing property on resins.

The pulp viscosity refers to a value determined in accordance with TAPPI T 230.

The freeness of the microfiber cellulose is preferably 500 ml or less, more preferably 300 ml or less, particularly preferably 100 ml or less. With a freeness of the microfiber cellulose over 500 ml, sufficient effect to enhance resin strength may not be obtained. Further, the microfiber cellulose may not be entangled with the interactive powder sufficiently to lack sufficient control over the fiber aggregation.

The freeness refers to a value determined in accordance with JIS P8121-2 (2012).

The zeta potential of the microfiber cellulose is preferably −150 to 20 mV, more preferably −100 to 0 mV, particularly preferably −80 to −10 mV. With a zeta potential below −150 mV, compatibility with resins may significantly be deteriorated, resulting in insufficient reinforcing effect. With a zeta potential over 20 mV, dispersion stability may be impaired.

The water retention of the microfiber cellulose is preferably 80 to 400%, more preferably 90 to 350%, particularly preferably 100 to 300%. With a water retention below 80%, the microfiber cellulose differs nothing from the raw material pulp, so that the reinforcing effect may be insufficient. With a water retention over 400%, dewaterability tends to be poor, and the microfiber cellulose tends to aggregate. Note that the water retention of the microfiber cellulose may be made still lower by the substitution of its hydroxy groups with carbamate groups, which may improve dewaterability and drying property.

The water retention of the microfiber cellulose may arbitrarily be adjusted by, for example, selection, pretreatment, or defibration of the raw material pulp.

The water retention refers to a value determined in accordance with JAPAN TAPPI No. 26 (2000).

The microfiber cellulose according to this embodiment has carbamate groups. It is not particularly limited how the microfiber cellulose has been caused to have carbamate groups. For example, the microfiber cellulose may have been caused to have carbamate groups through carbamation of a cellulose raw material, or through carbamation of microfiber cellulose (cellulose raw material that has been made finer).

Note that having carbamate groups means that carbamate groups (esters of carbamic acid) is introduced into the fibrous cellulose. Carbamate groups are represented by the formula —O—CO—NH—, and may be, for example, —O—CO—$NH_2$, —O—CONHR, or —O—CO—$NR_2$. That is, carbamate groups may be represented by the following structural formula (1).

[Formula 1]

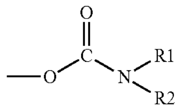

In the formula, R is independently at least any of a saturated straight chain hydrocarbon group, a saturated branched hydrocarbon group, a saturated cyclic hydrocarbon group, an unsaturated straight chain hydrocarbon group, an unsaturated branched hydrocarbon group, an aromatic group, and derivative groups thereof.

The saturated straight chain hydrocarbon group may be, for example, a straight chain alkyl group having 1 to 10 carbon atoms, such as a methyl group, an ethyl group, or a propyl group.

The saturated branched hydrocarbon group may be, for example, a branched alkyl group having 3 to 10 carbon atoms, such as an isopropyl group, a sec-butyl group, an isobutyl group, or a tert-butyl group.

The saturated cyclic hydrocarbon group may be, for example, a cycloalkyl group, such as a cyclopentyl group, a cyclohexyl group, or a norbornyl group.

The unsaturated straight chain hydrocarbon group may be, for example, a straight chain alkenyl group having 2 to 10 carbon atoms, such as an ethenyl group, a propene-1-yl group, or a propene-3-yl group, or a straight chain alkynyl group having 2 to 10 carbon atoms, such as an ethynyl group, a propyn-1-yl group, or a propyn-3-yl group.

The unsaturated branched hydrocarbon group may be, for example, a branched alkenyl group having 3 to 10 carbon atoms, such as a propene-2-yl group, a butene-2-yl group, or a butene-3-yl group, or a branched alkynyl group having 4 to 10 carbon atoms, such as a butyne-3-yl group.

The aromatic group may be, for example, a phenyl group, a tolyl group, a xylyl group, or a naphthyl group.

The derivative groups may be a saturated straight chain hydrocarbon group, a saturated branched hydrocarbon group, a saturated cyclic hydrocarbon group, an unsaturated straight chain hydrocarbon group, an unsaturated branched hydrocarbon group, or an aromatic group, having one or a plurality of hydrogen atoms thereof substituted with a substituent (for example, a hydroxy group, a carboxy group, or a halogen atom).

In the microfiber cellulose having carbamate groups (having carbamate groups introduced), part or all of the highly polar hydroxy groups have been substituted with relatively low polar carbamate groups. Thus, such microfiber cellulose with carbamate groups has lower hydrophilicity and higher affinity to resins having lower polarity. As a result, the microfiber cellulose with carbamate groups has excellent homogeneous dispersibility in the resin. Further, a slurry of the microfiber cellulose with carbamate groups has a lower viscosity and good handling property.

The substitution rate of the hydroxy groups of the microfiber cellulose with carbamate groups is preferably 1.0 to 5.0 mmol/g, more preferably 1.2 to 3.0 mmol/g, particularly preferably 1.5 to 2.0 mmol/g. With a substitution rate of 1.0 mmol/g or higher, effect from introduction of carbamate groups, particularly effect to improve the flexural modulus of resins, is securely achieved. On the other hand, at a substitution rate over 5.0 mmol/g, the cellulose fibers cannot maintain their fiber shapes, and sufficient reinforcing effect on resins may not be obtained.

The rate of substitution (mmol/g) with carbamate groups refers to the amount of the carbamate groups in millimole contained in 1 g of a cellulose raw material having carbamate groups. Note that cellulose is a polymer having anhydroglucose as a structural unit, wherein one structural unit includes three hydroxy groups.

<Carbamation>

The introduction of carbamate groups (carbamation) into microfiber cellulose (or cellulose raw material when the carbamation is effected before defibration, as the case may be, and referred to simply as microfiber cellulose hereinbelow) may be performed by carbamation of the cellulose raw material followed by making the resulting product finer, or by making the cellulose raw material finer followed by carbamation, as mentioned above. In the present specification, discussion of the defibration of cellulose raw material precedes discussion of the carbamation (modification), but either the defibration or the carbamation may precede. However, it is preferred to perform the carbamation first, followed by the defibration. This is because dewaterability of the cellulose raw material before the defibration is highly effective, and the defibration of the cellulose raw material may be facilitated by the heating associated with the carbamation.

The process of carbamating the microfiber cellulose or the like may generally be divided into, for example, a mixing step, a removing step, and a heating step. Here, the mixing step and the removing step may together be referred to as a preparation step wherein a mixture to be subjected to the heating step is prepared.

In the mixing step, the microfiber cellulose or the like (may be cellulose raw material as discussed above, as the case may be) and urea and/or derivatives thereof (sometimes referred to simply as "urea or the like" hereinbelow) are mixed in a dispersion medium.

The urea and/or the derivatives thereof may be, for example, urea, thiourea, biuret, phenylurea, benzylurea, dimethylurea, diethylurea, tetramethylurea, or compounds obtained by substituting the hydrogen atoms of urea with alkyl groups. One or a combination of a plurality of these urea or derivatives thereof may be used, and use of urea is preferred.

The lower limit of the mixing ratio by mass of the urea or the like to the microfiber cellulose (urea or the like/microfiber cellulose) is preferably 10/100, more preferably 20/100. The upper limit thereof is preferably 300/100, more preferably 200/100. With a mixing ratio by mass of 10/100 or higher, the carbamation efficiency is improved. With a mixing ratio by mass over 300/100, the carbamation plateaus.

The dispersion medium is usually water, but other dispersion media, such as alcohol or ether, or a mixture of water and other dispersion media may be used.

In the mixing step, for example, the microfiber cellulose and the urea or the like may be added to water, the microfiber cellulose may be added to an aqueous solution of the urea or the like, or the urea or the like may be added to a slurry containing the microfiber cellulose. The addition may be followed by stirring for homogeneous mixing. Further, the dispersion liquid containing the microfiber cellulose and the urea or the like may optionally contain other components.

In the removing step, the dispersion medium is removed from the dispersion liquid containing the microfiber cellulose and the urea or the like obtained from the mixing step. By removing the dispersion medium, the urea or the like may efficiently be reacted in the subsequent heating step.

The removal of the dispersion medium is preferably carried out by volatilizing the dispersion medium under heating. By this means, only the dispersion medium may efficiently be removed, leaving the components including the urea or the like.

The lower limit of the heating temperature in the removing step is, when the dispersion medium is water, preferably 50° C., more preferably 70° C., particularly preferably 90° C. At a heating temperature of 50° C. or higher, the dispersion medium may efficiently be volatilized (removed). On the other hand, the upper limit of the heating temperature is preferably 120° C., more preferably 100° C. At a heating temperature over 120° C., the dispersion medium and urea may react, disadvantageously resulting in self-decomposition of urea.

In the removing step, duration of the heating may suitably be adjusted depending on the solid concentration of the dispersion liquid, or the like, and may specifically be, for example, 6 to 24 hours.

In the heating step following the removing step, the mixture of the microfiber cellulose or the like and the urea or the like is heat treated. In this heating step, part or all of the hydroxy groups of the microfiber cellulose or the like are reacted with the urea or the like and substituted with carbamate groups. More specifically, the urea or the like, when heated, is decomposed into isocyanic acid and ammonia as shown by the reaction formula (1) below, and the isocyanic acid, which is highly reactive, reacts with the hydroxyl groups of cellulose to form carbamate groups, for example, as shown by the reaction formula (2) below.

$$NH_2{-}CO{-}NH_2 \longrightarrow H{-}N{=}C{=}O + NH_3 \quad (1)$$

$$\text{Cell}{-}OH + H{-}N{=}C{=}O \longrightarrow \text{Cell}{-}O{-}CO{-}NH_2 \quad (2)$$

The lower limit of the heating temperature in the heating step is preferably 120° C., more preferably 130° C., particularly preferably the melting point of urea (about 134° C.) or higher, still more preferably 140° C., most preferably 150° C. At a heating temperature of 120° C. or higher, carbamation proceeds efficiently. The upper limit of the heating temperature is preferably 200° C., more preferably 180° C., particularly preferably 170° C. At a heating temperature over 200° C., the microfiber cellulose may decompose, which may lead to insufficient reinforcing effect.

The lower limit of duration of the heating in the heating step is preferably 1 minute, more preferably 5 minutes, particularly preferably 30 minutes, still more preferably 1 hour, most preferably 2 hours. With the heating for 1 minute or longer, the carbamation reaction may be ensured. On the other hand, the upper limit of duration of the heating is preferably 15 hours, more preferably 10 hours. The heating for over 15 hours is not economical, and sufficient carbamation may be effected in 15 hours.

Yet, prolonged heating may deteriorate cellulose fibers. In this light, pH conditions in the heating step are important. The pH is preferably pH 9 or higher, more preferably pH 9 to 13, particularly preferably pH 10 to 12, which are under the alkaline conditions. The second best is at pH 7 or lower, preferably pH 3 to 7, particularly preferably pH 4 to 7, which are under the acidic or neutral conditions. Under the neutral conditions at pH 7 to 8, the average fiber length of the cellulose fibers may be shorter, resulting in inferior reinforcing effect on resins. On the other hand, under the alkaline conditions at pH 9 or higher, reactivity of the cellulose fibers may be enhanced, which promotes reaction with the urea or the like, resulting in efficient carbamation to ensure sufficient average fiber length of the cellulose fibers. Under the acidic conditions at pH 7 or lower, decomposition reaction of urea or the like into isocyanic acid and ammonia proceeds, which promotes reaction with the cellulose fibers, resulting in efficient carbamation to ensure sufficient average fiber length of the cellulose fibers. It is, however, preferred to perform the heating step under the alkaline conditions, where possible, as acid hydrolysis of cellulose may adversely proceed under the acidic conditions.

The pH may be adjusted by adding to the mixture an acidic compound (for example, acetic acid or citric acid) or an alkaline compound (for example, sodium hydroxide or calcium hydroxide).

For the heating in the heating step, for example, a hot air dryer, a paper machine, or a dry pulp machine may be used.

The mixture obtained from the heating step may be washed. The washing may be carried out with water or the like. By this washing, unreacted residual urea or the like may be removed.

<Slurry>

The microfiber cellulose is dispersed in an aqueous medium to prepare a dispersion (slurry), as needed. The aqueous medium is particularly preferably water in its entirety, but aqueous medium partly containing another liquid compatible with water may also be used. Such another liquid may be, for example, a lower alcohol having 3 or less carbon atoms.

The solid concentration of the slurry is preferably 0.1 to 10.0 mass %, more preferably 0.5 to 5.0 mass %. With a solid concentration below 0.1 mass %, an excessive amount of energy may be required for dewatering and drying. With a solid concentration over 10.0 mass %, fluidity of the slurry per se may be too low to homogeneously admix with the dispersant, when used.

<Interactive Powder>

The fibrous cellulose-containing material according to the present embodiment contains interactive powder that is interactive with the fibrous cellulose. The fibrous cellulose-containing material, by containing the interactive powder, may be made into a form for developing reinforcing property on resins. That is, when fibrous cellulose is used in the form of a slurry, the aqueous medium contained in the slurry is preferably removed before the fibrous cellulose is made into a composite with resin. However, during removing the aqueous medium, cellulose may aggregate irreversibly via hydrogen bonding between the cellulose molecules, and may not be able to produce sufficient reinforcing effect as fibers. In view of this, hydrogen bonding of cellulose is physically blocked by the interactive powder contained in the fibrous cellulose slurry. Incidentally, powder that is non-interactive with the fibrous cellulose may probably aggregate upon drying, but the interactive powder may not. These things considered, the interactive powder is preferably acid-modified resin power, more preferably maleic anhydride-modified resin powder, particularly preferably maleic anhydride-modified polypropylene (MAPP) powder. Details of the acid-modified resin will be discussed later.

As used herein, "interactive" means forming a firm bonding with cellulose by means of covalent bonding, ionic bonding, or metallic bonding (i.e., hydrogen bonding and bonding with van der Waals force do not fall under the concept of being interactive). Preferably, the firm bonding is bonding with a binding energy of 100 kJ/mol or more.

The volume average particle size of the interactive powder is preferably 0.01 to 10000 μm, more preferably 50 to 750 μm, particularly preferably 150 to 450 μm. With a volume average particle size over 10000 μm, the interactive powder may not be able to enter the gaps among cellulose fibers to block the aggregation. With a volume average particle size below 0.01 μm, the powder may be too fine to block hydrogen bonding between microfiber cellulose molecules.

The ratio of 90% particle size of the interactive powder to 10% particle size of the interactive powder is preferably 2 to 1000, more preferably 10 to 200. With the particle size ratio falling within the above range, the effect of the interactive powder to block aggregation is fully developed, even when the fibrous cellulose is microfiber cellulose and has wide variation in fiber length. Specifically, with a ratio of 90% particle size to 10% particle size below 2, the particle size is too uniform, and the interactive effect can be produced with only the fibers of particular fiber length. With a ratio of 90% particle size to 10% particle size over 1000, the variation in particle size is extremely wide, and the fiber length which allows the interaction may be limited.

As used herein, the 90% particle size means the particle size within which 90% of the particles are included as added up from the particles of the smallest particle size. Similarly, the 10% particle size means the particle size within which 10% of the particles are included as added up from the particles of the smallest particle size.

The arithmetic standard deviation of the particle size of the interactive powder is preferably 0.01 to 10000 μm, more preferably 1 to 5000 μm, particularly preferably 10 to 1000 μm. The particle size of the powder, though caused to have variation as discussed above, falls within the range of fibrous cellulose in the sense that the fibrous cellulose is microfiber cellulose, which accordingly limits the arithmetic standard deviation of the particle size of the powder. In this regard, with the arithmetic standard deviation below 0.01 μm, the particle size is too uniform, and the interactive effect can be produced with only the fibers of particular fiber length. With the arithmetic standard deviation over 10000 μm, the particle size is excessively nonuniform, and the range of the fiber length that may be interacted is too broad, so that the interactive effect may hardly be produced.

The arithmetic standard deviation refers to a value determined with a particle size distribution measuring device (for example, Laser Scattering Particle Size Distribution Analyzer manufactured by HORIBA, LTD.).

Further, the ratio of the volume average particle size in micrometer of the interactive powder to the average fiber length in micrometer of the fibrous cellulose may be preferably 0.005 to 5000, more preferably 0.01 to 1000. Within this range, the powder and the fibers are further entangled, to keep the fibers from aggregation. More specifically, with the ratio of the volume average particle size of the interactive powder to the average fiber length of the fibrous cellulose below 0.005, the fibers per se interact with each other to hinder sufficient interaction with the interactive powder, which may result in insufficient reinforcing effect.

With the ratio of the volume average particle size of the interactive powder to the average fiber length of the fibrous cellulose over 5000, the fibrous cellulose may have too small a number of points to interact with the interactive powder, which is in a spherical shape, so that sufficient interaction may not be achieved, which results in insufficient reinforcing effect.

As used herein, the volume average particle size of the interactive powder refers to a volume average particle size calculated from a volume-based particle size distribution determined for the interactive powder as it is or in an aqueous dispersion, using a particle size distribution measuring device (for example, Laser Scattering Particle Size Distribution Analyzer manufactured by HORIBA, LTD.).

The interactive powder according to the present embodiment is preferably resin powder. With the interactive powder being resin powder, which melts during kneading to no longer be in a powder form, presence of particles with various particle sizes in a mixed manner will have no impact. The resin powder may be or may not be, for example, powder of resin similar to the one used in obtaining the composite resin.

The amount of the interactive powder to be added is preferably 1 to 9900 mass %, more preferably 5 to 1900 mass %, particularly preferably 10 to 900 mass % of the amount of the fibrous cellulose. Below 1 mass %, the interactive powder may not be able to enter the gaps among the cellulose fibers to block the aggregation sufficiently. Over 9900 mass %, the interactive powder may disturb the cellulose fibers from fulfilling their functions.

The interactive powder may be used in combination with inorganic powder. With the interactive powder and the inorganic powder used in combination, even when the inorganic powder and the interactive powder are mixed under the conditions that the respective powders may aggregate separately, the two powders may mutually act to disturb the respective aggregations. Further, powder with a smaller particle size has a larger surface area, which causes tendency of being affected by the intermolecular force, rather than the gravity, resulting in easier aggregation. Accordingly, the powder, upon mixing with the microfiber cellulose slurry, may not be loosened well in the slurry, or may aggregate during removal of the aqueous medium, so that the powder may not sufficiently produce its effect to block the aggregation of the microfiber cellulose. It is assumed that, however, by combining the inorganic powder and the interactive powder, the aggregation of the respective powders on its own is assumed to be alleviated.

The inorganic powder may be powder of a simple substance of a metal element belonging to Groups I to VIII of the Periodic Table, such as Fe, Na, K, Cu, Mg, Ca, Zn, Ba, Al, Ti, or silicon element, oxides thereof, hydroxides thereof, carbonates thereof, sulfates thereof, silicates thereof, sulfites thereof, or various clay minerals formed of these compounds. Specific examples may include, for example, barium sulfate, calcium sulfate, magnesium sulfate, sodium sulfate, calcium sulfite, zinc oxide, heavy calcium carbonate, light calcium carbonate, aluminum borate, alumina, iron oxide, calcium titanate, aluminum hydroxide, magnesium hydroxide, calcium hydroxide, sodium hydroxide, magnesium carbonate, calcium silicate, clay, wollastonite, glass beads, glass powder, silica gel, fumed silica, colloidal silica, silica sand, silica stone, quartz powder, diatomaceous earth, white carbon, and glass fiber. A plurality of these inorganic powders may be contained. The inorganic powder may be those contained in de-inked pulp, or so-called regenerated filler obtained by regenerating inorganic materials in paper sludge.

Preferably at least one inorganic powder selected from calcium carbonate, talc, white carbon, clay, sintered clay, titanium dioxide, and aluminum hydroxide, which are suitably used as paper fillers or pigments, and regenerated fillers, more preferably at least one inorganic powder selected from calcium carbonate, talc, and clay, particularly preferably either light calcium carbonate or heavy calcium carbonate, may be used. Calcium carbonate, talc, or clay, when used, facilitates compounding with a matrix of resin or the like. As these are general-purpose inorganic materials, no limit is imposed on their intended use, which is advantageous. Further, calcium carbonate is particularly preferred for the following reasons. With light calcium carbonate, size and shape of the powder may easily be made constant. This facilitates tailoring of the size and shape of the powder depending on the size and shape of cellulose fibers so as to facilitate entry of the powder into the gaps among cellulose fibers to block aggregation, thereby providing advantage of facilitating production of pinpoint effect. With heavy calcium carbonate, which has irregular shape, the powder, in the course of aggregation of the fibers during removal of the aqueous medium from the slurry, may advantageously enter the gaps among cellulose fibers to block aggregation even where various sizes of fibers are present in the slurry.

In combining the inorganic powder and the interactive powder, the ratio of the average particle size of the inorganic powder to the average particle size of the interactive powder is preferably 1:0.1 to 1:10000, more preferably 1:1 to 1:1000. It is assumed that, with the ratio within this range, the problems arising from the strength of each powder to aggregate on its own (the problems, for example, of difficulties upon mixing the powder and the microfiber cellulose slurry to loosen the powder in the slurry, or of aggregation of the powder during removal of the aqueous medium) will not occur, and the effect to block the aggregation of the microfiber cellulose may fully be exerted.

In combining the inorganic powder and the interactive powder, the ratio of the amount in percent by mass of the inorganic powder to the amount in percent by mass of the interactive powder is preferably 1:0.01 to 1:100, more preferably 1:0.1 to 1:10. It is assumed that, with the ratio within this range, the different kinds of powder may mutually disturb the respective aggregations. It is also assumed that, with the ratio within this range, the problems arising from the strength of each powder to aggregate on its own (the problems, for example, of difficulties upon mixing the powder and the microfiber cellulose slurry to loosen the powder in the slurry, or of aggregation of the powder during removal of the aqueous medium) will not occur, and the effect to block the aggregation of the microfiber cellulose may fully be exerted.

<Acid-Modified Resin>

As discussed above, the interactive powder is preferably resin powder, and the resin is preferably acid-modified resin. Acid-modified resin has acid radicals capable of being ionically bonded to part or all of the carbamate groups. By this ionic bonding, the effect of the resin powder to block the aggregation may effectively be developed.

The acid-modified resin may be, for example, acid-modified polyolefin resins, acid-modified epoxy resins, or acid-modified styrene elastomer resins. It is preferred to use acid-modified polyolefin resins. An acid-modified polyolefin resin is a copolymer of an unsaturated carboxylic acid component and a polyolefin component.

As the polyolefin component, one or more polymers of alkenes may be selected and used from the group consisting of, for example, ethylene, propylene, butadiene, and isoprene. Preferably, use of a polypropylene resin, which is a polymer of propylene, is preferred.

As the unsaturated carboxylic acid component, one or more members may be selected and used from the group consisting of, for example, maleic anhydrides, phthalic anhydrides, itaconic anhydrides, citraconic anhydrides, and citric anhydrides. Preferably, use of maleic anhydrides is preferred. In other words, use of maleic anhydride-modified polypropylene resins is particularly preferred.

The amount of the acid-modified resin to be added is preferably 0.1 to 1000 parts by mass, more preferably 1 to 500 parts by mass, particularly preferably 10 to 200 parts by mass, based on 100 parts by mass of the microfiber cellulose. In particular, when the acid-modified resin is a maleic anhydride-modified polypropylene resin, the amount to be added is preferably 1 to 200 parts by mass, more preferably 10 to 100 parts by mass. With an amount of the acid-modified resin to be added below 0.1 parts by mass, the aggregate-blocking effect is not sufficient. An amount to be added over 1000 parts by mass adversely tends to lower the aggregate-blocking effect.

The weight average molecular weight of the maleic anhydride-modified polypropylene is, for example, 1000 to 100000, preferably 3000 to 50000.

The acid value of the maleic anhydride-modified polypropylene is preferably 0.5 mgKOH/g or more and 100 mgKOH/g or less, more preferably 1 mgKOH/g or more and 50 mgKOH/g or less.

The acid value of the maleic anhydride-modified polypropylene is determined by titration with potassium hydroxide in accordance with JIS-K2501.

<Dispersant>

The microfiber cellulose is more preferably mixed with a dispersant. As the dispersant, aromatic compounds having an amine group and/or a hydroxyl group or aliphatic compounds having an amine group and/or a hydroxyl group are preferred.

Examples of the aromatic compounds having an amine group and/or a hydroxyl group may include anilines, toluidines, trimethylanilines, anisidines, tyramines, histamines, tryptamines, phenols, dibutylhydroxytoluenes, bisphenol A's, cresols, eugenols, gallic acids, guaiacols, picric acids, phenolphthaleins, serotonins, dopamines, adrenalines, noradrenalines, thymols, tyrosines, salicylic acids, methyl salicylates, anisyl alcohols, salicyl alcohols, sinapyl alcohols, difenidols, diphenylmethanols, cinnamyl alcohols, scopolamines, triptophols, vanillyl alcohols, 3-phenyl-1-propanols, phenethyl alcohols, phenoxyethanols, veratryl alcohols, benzyl alcohols, benzoins, mandelic acids, mandelonitriles, benzoic acids, phthalic acids, isophthalic acids, terephthalic acids, mellitic acids, and cinnamic acids.

Examples of the aliphatic compounds having an amine group and/or a hydroxyl group may include capryl alcohols, 2-ethylhexanols, pelargonic alcohols, capric alcohols, undecyl alcohols, lauryl alcohols, tridecyl alcohols, myristyl alcohols, pentadecyl alcohols, cetanols, stearyl alcohols, elaidyl alcohols, oleyl alcohols, linoleyl alcohols, methylamines, dimethylamines, trimethylamines, ethylamines, diethylamines, ethylenediamines, triethanolamines, N,N-diisopropylethylamines, tetramethylethylenediamines, hexamethylenediamines, spermidines, spermines, amantadines, formic acids, acetic acids, propionic acids, butyric acids, valeric acids, caproic acids, enanthic acids, caprylic acids, pelargonic acids, capric acids, lauric acids, myristic acids, palmitic acids, margaric acids, stearic acids, oleic acids, linolic acids, linoleic acids, arachidonic acids, eicosapentaenoic acids, docosahexaenoic acids, and sorbic acids.

The dispersants mentioned above block hydrogen bonding between the molecules of the cellulose fibers. Consequently, the microfiber cellulose, in kneading with resin, is reliably dispersed in the resin. Further, the dispersants mentioned above also have a role to improve the compatibility of the microfiber cellulose and resin. In this regard, the dispersibility of the microfiber cellulose in the resin is improved.

It is conceivable, in kneading the fibrous cellulose and resin, to add a separate compatibilizer (agent), but mixing the microfiber cellulose and the dispersant (agent) in advance, rather than adding the agent at this stage, results in more uniform clinging of the agent over the microfiber cellulose, to thereby enhance the effect to improve compatibility with the resin.

In addition, as the melting point of polypropylene, for example, is 160° C., the fibrous cellulose and the resin are kneaded at about 180° C. In this state, the dispersant (liquid), if added, will be dried instantaneously. In this regard, there is known to prepare a masterbatch (a composite resin containing a high concentration of microfiber cellulose) using a resin with a lower melting point, and then lower the concentration of the microfiber cellulose using a resin with an ordinary melting point. However, since resins with a lower melting point are generally lower in strength, the strength of the composite resin may be lower according to this method.

The amount of the dispersant to be mixed is preferably 0.1 to 1000 parts by mass, more preferably 1 to 500 parts by mass, particularly preferably 10 to 200 parts by mass, based on 100 parts by mass of the microfiber cellulose. With an amount of the dispersant to be added below 0.1 parts by mass, improvement in resin strength may not be sufficient. An amount of the dispersant to be added over 1000 parts by mass is excessive and tends to lower the resin strength.

It is assumed that the acid-modified resin discussed above is intended to improve the reinforcing effect through improvement of compatibility by its acid radicals ionically bonded with the carbamate groups of the microfiber cellulose, and has a large molecular weight and thus blends well with the resin (improvement in adhesion), contributing to the improvement in strength. On the other hand, the dispersant mentioned above is intended to improve dispersibility in the resin through blocking of the aggregation by being interposed between the hydroxyl groups of the microfiber cellulose, and has a lower molecular weight than that of the acid-modified resin, and thus is capable of entering the narrow space among the fibers of the microfiber cellulose, where the acid-modified resin cannot enter, to play a part in enhancing the dispersibility and thus the strength. In view of the above, it is preferred that the molecular weight of the acid-modified resin is 2 to 2000 times, preferably 5 to 1000 times the molecular weight of the dispersant.

As discussed in more detail below, the interactive powder is physically interposed among the fibers of the microfiber cellulose to block the hydrogen bonding, thereby improving dispersibility of the microfiber cellulose. In particular, the acid-modified resin has the acid radicals ionically bonded with the carbamate groups of the microfiber cellulose and, accordingly, is come to exist near the fibers in priority to other substances to exert the aggregation-blocking effect on the fibers. Further, in mixing the fibrous cellulose-containing material and resin to prepare a composite resin, the interactive powder plays a role to bring the resin into close adhesion with the microfiber cellulose to enhance mechanical strength of the composite resin. Here, the dispersant has the same function to block the hydrogen bonding between the molecules of the microfiber cellulose, while the interactive powder, which is on the micrometer order, is physically interposed among the fibers to interfere with the hydrogen bonding. Accordingly, though having a poorer dispersing property compared to that of the dispersant, the resin powder per se does not cause deterioration of the physical properties as it is molten to form a matrix. In contrast, the dispersant, which is on the molecular level and extremely small, covers the microfiber cellulose to block the hydrogen bonding, which results in higher efficacy in improving dispersibility of the microfiber cellulose. However, the dispersant may remain in the resin and cause deterioration of the physical properties.

<Method for Preparing Composite Resin>

The mixture of the fibrous cellulose-containing material, the dispersant, and the like, may be dried and ground into a powdered product prior to kneading with the resin. In this form, the fibrous cellulose is not necessarily dried before kneading with the resin, which is thermally efficient. Further, when the non-interactive powder or the dispersant is already mixed in the mixture, the fibrous cellulose (microfiber cellulose) is less likely to be unredispersible even after the mixture is dried.

The mixture is dehydrated into a dehydrated product, as needed, prior to the drying. For the dehydration, one or more dehydrators may be selected and used from the group consisting of, for example, belt presses, screw presses, filter presses, twin rolls, twin wire formers, valveless filters, center disk filters, film treatment units, and centrifuges.

For drying the mixture, one or more means may be selected and used from the group consisting of, for example, rotary kiln drying, disk drying, air flow drying, medium fluidized drying, spray drying, drum drying, screw conveyor drying, paddle drying, single-screw kneading drying, multi-screw kneading drying, vacuum drying, and stirring drying.

The dried mixture (dried product) is pulverized into a powdered product. For pulverizing the dried product, one or more means may be selected and used from the group consisting of, for example, bead mills, kneaders, dispersers, twist mills, cut mills, and hammer mills.

The average particle size of the powdered product is preferably 1 to 10000 μm, more preferably 10 to 5000 μm, particularly preferably 100 to 1000 μm. With an average particle size over 10000 μm, the powdered product may have inferior kneadability with the resin. On the other hand, making the average particle size of the powdered product below 1 μm requires a high amount of energy, which is not economical.

The average particle size of the powdered product may be controlled by regulating the degree of pulverization, or by classification in classification apparatus, such as filters or cyclones.

The bulk specific gravity of the mixture (powdered product) is preferably 0.03 to 1.0, more preferably 0.04 to 0.9, particularly preferably 0.05 to 0.8. A bulk specific gravity exceeding 1.0 means the hydrogen bonding between the molecules of the fibrous cellulose being still firmer, so that dispersion in the resin is not easy. A bulk specific gravity of less than 0.03 is disadvantageous in view of transportation cost.

The bulk specific gravity is determined in accordance with JIS K7365.

The moisture percentage of the mixture (powdered product) is preferably 50% or lower, more preferably 30% or lower, particularly preferably 10% or lower. With a moisture percentage over 50%, a vast amount of energy is required for kneading with the resin, which is not economical. The moisture percentage is a value determined by holding a sample at 105° C. for 6 hours or longer in a constant temperature dryer until fluctuation in mass is not observed and measuring the mass as a mass after drying, and calculated by the following formula:

$$\text{Fiber moisture percentage (\%)}=[(\text{mass before drying}-\text{mass after drying})/\text{mass before drying}]\times 100$$

The powdered product thus obtained (fibrous cellulose-containing material) is kneaded with resin, as necessary, to thereby obtain a fibrous cellulose composite resin. The kneading may be performed by, for example, mixing resin in the form of pellets with the powdered product, or by first melting resin to obtain a molten product and then mixing the powdered product into the molten product. When the interactive powder is the resin powder, such as the acid-modified resin powder, the powdered product (fibrous cellulose-containing material) may immediately be kneaded, without being mixed with resin, to obtain a composite resin.

The mixture (powdered product or fibrous cellulose-containing material), with the total amount being 100 parts by mass, preferably contains over 55 parts by mass, particularly 60 parts by mass or more of the fibrous cellulose. Usually, when a mixture containing over 55 parts by mass of fibrous cellulose is kneaded with resin, dispersibility of the mixture in the resin is poor, resulting in inferior mixability. In contrast, the mixture according to the present invention contains the fibrous cellulose having hydroxyl groups partially or fully substituted with carbamate groups, and the interactive powder that is interactive with the fibrous cellulose, so that even when over 55 parts by mass of the fibrous cellulose is contained, high dispersibility may be maintained in kneading with resin. A higher concentration of the fibrous cellulose in the mixture is preferred also in view of the fact that the amount of the mixture used for causing the composite resin to contain a certain proportion of fibrous cellulose may be reduced.

For the kneading treatment, one or more members may be selected and used from the group consisting of, for example, single-screw or multi-screw (with two or more screws) kneaders, mixing rolls, kneaders, roll mills, Banbury mixers, screw presses, and dispersers. Among these, multi-screw kneaders with two or more screws are preferably used. Two or more multi-screw kneaders with two or more screws, arranged in parallel or in series, may also be used.

The temperature for the kneading treatment is the glass transition temperature of the resin or higher and may depend on the type of the resin, and is preferably 80 to 280° C., more preferably 90 to 260° C., particularly preferably 100 to 240° C.

As the resin, at least either one of a thermoplastic resin or a thermosetting resin may be used.

As a thermoplastic resin, one or more resins may be selected and used from the group consisting of, for example, polyolefins, such as polypropylene (PP) and polyethylene (PE), polyester resins, such as aliphatic polyester resins and aromatic polyester resins, polystyrenes, polyacrylic resins, such as polymethacrylates and polyacrylates, polyamide resins, polycarbonate resins, and polyacetal resins.

It is preferred, however, to use at least either one of polyolefins and polyester resins. Polyolefins may preferably be polypropylenes. Polyester resins may be aliphatic polyester resins, such as polylactic acid or polycaprolactone, or aromatic polyester resins, such as polyethylene terephthalate, and biodegradable polyester resins (also referred to simply as "biodegradable resins") may preferably be used.

As the biodegradable resin, one or more members may be selected and used from the group consisting of, for example, hydroxycarboxylic acid-based aliphatic polyesters, caprolactone-based aliphatic polyesters, and dibasic acid polyesters.

As the hydroxycarboxylic acid-based aliphatic polyester, one or more members may be selected and used from the group consisting of, for example, homopolymers of a hydroxycarboxylic acid, such as lactic acid, malic acid, glucose acid, or 3-hydroxybutyric acid, and copolymers using at least one of these hydroxycarboxylic acids. It is preferred to use polylactic acid, a copolymer of lactic acid and any of the hydroxycarboxylic acids other than lactic acid, polycaprolactone, or a copolymer of caprolactone and at least one of the hydroxycarboxylic acids, and particularly preferred to use polylactic acid.

The lactic acid may be, for example, L-lactic acid or D-lactic acid, and a single kind or a combination of two or more kinds of these lactic acids may be used.

As the caprolactone-based aliphatic polyester, one or more members may be selected and used from the group consisting of, for example, homopolymers of polycaprolactone, and copolymers of polycaprolactone and any of the hydroxycarboxylic acids mentioned above.

As the dibasic acid polyester, one or more members may be selected and used from the group consisting of, for example, polybutylene succinates, polyethylene succinates, and polybutylene adipates.

A single kind alone or a combination of two or more kinds of the biodegradable resins may be used.

Examples of the thermosetting resins may include phenol resins, urea resins, melamine resins, furan resins, unsaturated polyesters, diallyl phthalate resins, vinyl ester resins, epoxy resins, polyurethane-based resins, silicone resins, and thermosetting polyimide-based resins. A single kind or a combination of two or more kinds of these resins may be used.

The ratio of the fibrous cellulose and the resin is preferably 1 part by mass or more of the fibrous cellulose and 99 parts by mass or less of the resin, more preferably 2 parts by mass or more of the fibrous cellulose and 98 parts by mass or less of the resin, particularly preferably 3 parts by mass or more of the fibrous cellulose and 97 parts by mass or less of the resin. Further, the ratio is preferably 50 parts by mass or less of the fibrous cellulose and 50 parts by mass or more of the resin, more preferably 40 parts by mass or less of the fibrous cellulose and 60 parts by mass or more of the resin, particularly preferably 30 parts by mass or less of the fibrous cellulose and 70 parts by mass or more of the resin. In particular, with 10 to 50 parts by mass of the fibrous cellulose, strength of the resin composition, in particular, bending strength and tensile elastic modulus, may be significantly enhanced.

It is noted that the ratio of the fibrous cellulose and the resin contained in the eventually obtained resin composition is usually the same as the mixing ratio of the fibrous cellulose and the resin mentioned above.

The difference in solubility parameter $(cal/cm^3)^{1/2}$ (SP value) between the microfiber cellulose and the resin, that is, supposing that the SP value of the microfiber cellulose is $SP_{MFC}$ value and the SP value of the resin is $SP_{POL}$ value, the difference in SP value may be obtained by the formula: Difference in SP value=$SP_{MFC}$ value−$SP_{POL}$ value. The difference in SP value is preferably 10 to 0.1, more preferably 8 to 0.5, particularly preferably 5 to 1. With a difference in SP value over 10, the microfiber cellulose is not dispersed in the resin, and thus the reinforcing effect may not be obtained. With a difference in SP value below 0.1, the microfiber cellulose is disadvantageously dissolved in the resin and does not function as a filler, so that the reinforcing effect cannot be obtained. In this regard, a smaller difference between the $SP_{POL}$ value of the resin (solvent) and the $SP_{MFC}$ value of the microfiber cellulose (solute) indicates higher reinforcing effect.

It is noted that the solubility parameter $(cal/cm^3)^{1/2}$ (SP value) refers to a scale of solvent/solute intermolecular force, and a solvent and a solute having closer SP values result in higher solubility.

<Molding Process>

The kneaded product of the fibrous cellulose-containing material and the resin may be molded into a desired form, following another kneading, if necessary. The size, thickness, form, and the like resulting from the molding are not particularly limited, and the molded product may be in the form of, for example, sheets, pellets, powders, or fibers.

The temperature during the molding process is at or higher than the glass transition point of the resin, and may be, for example, 90 to 260° C., preferably 100 to 240° C., depending on the kind of the resin.

The kneaded product may be molded by, for example, die molding, injection molding, extrusion molding, hollow molding, or foam molding. The kneaded product may be spun into a fibrous shape, mixed with plant materials or the like, and formed into a mat shape or a board shape. The mixing may be performed by, for example, simultaneous deposition by air-laying.

As a machine for molding the kneaded product, one or more machines may be selected and used from the group consisting of, for example, injection molding machine, a blow molding machine, a hollow molding machine, a blow molding machine, a compression molding machine, an extrusion molding machine, a vacuum molding machine, and a pressure molding machine.

The molding discussed above may be performed following the kneading, or by first cooling the kneaded product, chipping the cooled product in a crusher or the like, and then introducing the resulting chips in a molding machine, such as an extrusion molding machine or an injection molding machine. It is noted that the molding is not an essential requirement of the present invention.

<Other Components>

The fibrous cellulose-containing material may contain cellulose nanofibers, together with the microfiber cellulose. Cellulose nanofibers are fine fibers, like microfiber cellulose, and have a role to complement the microfiber cellulose in enhancing the strength of resins. However, the fine fibers are preferably only the microfiber cellulose without cellulose nanofibers, where possible. Note that the average fiber diameter (average fiber width, or average of diameters of single fibers) of the cellulose nanofibers is preferably 4 to 100 nm, more preferably 10 to 80 nm.

Further, the fibrous cellulose-containing material may contain pulp. Pulp has a role to remarkably improve the dewaterability of a cellulose fiber slurry. Like the cellulose nanofibers, however, it is most preferred that the pulp is also not contained, that is, at a content percentage of 0 mass %.

In addition to the fine fibers and pulp or the like, the resin composition (composite resin) may contain or may be caused to contain fibers derived from plant materials obtained from various plants, such as kenaf, jute hemp, manila hemp, sisal hemp, ganpi, mitsumata, mulberry, banana, pineapple, coconut, corn, sugar cane, bagasse, palm, papyrus, reed, esparto, survival grass, wheat, rice, bamboo, various kinds of softwood (cedar, cypress, and the like), hardwood, and raw cotton.

In the resin composition, one or more members selected from the group consisting of, for example, antistatic agents, flame retardants, antibacterial agents, colorants, radical scavengers, and foaming agents may be added without disturbing the effects of the present invention. These materials may be added to the dispersion of the fibrous cellulose, added while the fibrous cellulose and the resin are kneaded, added to the resulting kneaded product, or added otherwise. In view of the manufacturing efficiency, these materials may preferably be added while the fibrous cellulose and the resin are kneaded.

The resin composition may contain, as a rubber component, ethylene/α-olefin copolymer elastomers or styrene-butadiene block copolymers. Examples of α-olefins may include butene, isobutene, pentene, hexene, methyl-pentene, octene, decene, and dodecene.

EXAMPLES

Next, Examples of the present invention will now be discussed.

To 1570 g of microfiber cellulose having a solid concentration of 2.8 mass %, 22.0 g of maleic anhydride-modified polypropylene (MAPP) having a uniform particle size or maleic anhydride-modified polypropylene (MAPP) having various particle sizes was added, and heated by means of a contact dryer heated to 140° C., to thereby obtain carbamate-modified microfiber cellulose-containing material. The moisture content of the carbamate-modified microfiber cellulose-containing material was 5 to 22%.

The fibers were modified with the carbamate in the following manner.

Softwood kraft pulp having a moisture percentage of 10% or lower, an aqueous solution of urea having 10% solid concentration, and a 20% aqueous solution of citric acid were mixed at a mass ratio in terms of solids of pulp:urea:citric acid=100:50:0.1, and dried at 105° C. Then the resulting mass was subjected to heat treatment at a predetermined reaction temperature for a predetermined reaction time to obtain carbamate-modified pulp (carbamated pulp). The carbamate-modified pulp thus obtained was diluted with distilled water, stirred, and dewatered to wash, which was repeated twice. The washed carbamate-modified pulp was beaten in a beater until a predetermined amount thereof has a fiber length of 0.2 mm or shorter and a predetermined amount thereof has a fiber length of 0.2 to 0.6 mm, to thereby obtain carbamate-modified microfiber cellulose (carbamated MFC (fine fibers)).

Further, the maleic anhydride-modified polypropylene was replaced with 22.0 g of polypropylene powder, to prepare carbamate-modified microfiber cellulose-containing material as a Comparative Example. The moisture content of obtained carbamate-modified microfiber cellulose-containing material was 5 to 22%.

To each carbamate-modified microfiber cellulose-containing material, polypropylene pellets were added so that the ratio of the carbamate-modified microfiber to the remaining components was 10:90, mixed, and kneaded in a twin-screw kneader at 180° C. at 200 rpm, to thereby obtain carbamate-modified microfiber cellulose composite resin with a 10% fiber content.

The carbamate-modified microfiber cellulose composite resin thus obtained was cut in a pelleter into cylinders of 2 mm diameter and 2 mm long, and injection-molded at 180° C. into a cuboid test piece (59 mm long, 9.6 mm wide, and 3.8 mm thickness). Each test piece thus obtained was subjected to determination of flexural modulus. The results were scored on the following basis, and are shown in Table 1 together with the particle size (particle diameter) of the MAPP and the fiber size (fiber length) of the fibrous cellulose.

<Flexural Modulus>

Flexural modulus was determined in accordance with JIS K 7171: 2008. In the Table, the evaluation results are shown on the following basis.

Based on the flexural modulus of the resin per se being 1, where the flexural modulus (factor) of the composite resin is 1.45 times or more: O Based on the flexural modulus of the resin per se being 1, where the flexural modulus (factor) of the composite resin is 1.40 times or more and less than 1.45 times: Δ

Based on the flexural modulus of the resin per se being 1, where the flexural modulus (factor) of the composite resin is less than 1.40 times: x

TABLE 1

| | Proportions in carbamate-modified microfiber cellulose-containing material (%) | | | Particle size of MAPP | | Fiber size | | | | |
|---|---|---|---|---|---|---|---|---|---|---|
| | Modified CNF | PP | MAPP | Arithmetic standard deviation (mm) | 90% particle size/10% particle size | Average fiber length (mm) | Percentage of fibers with a fiber length of 0.2 to 0.6 mm | Percentage of fibers with a fiber length less than 0.2 mm | Mode for the diameter (width) of fibers (mm) | Flexural modulus — |
| Example 1 | 66 | — | 33 | 503.01 | 93.08 | 0.18 | 26% | 73% | 2-4 | ○ |
| Example 2 | 66 | — | 33 | 104.02 | 20.09 | 0.18 | 26% | 73% | 2-4 | ○ |
| Example 3 | 66 | — | 33 | 503.01 | 93.08 | 0.55 | 40% | 26% | 2-4 | ○ |
| Example 4 | 66 | — | 33 | 68.15 | 3.66 | 0.18 | 26% | 73% | 2-4 | Δ |
| Example 5 | 66 | — | 33 | 503.01 | 93.08 | 1.46 | 13% | 8% | 13-15 | Δ |
| Comp. Ex. 1 | 66 | 33 | — | — | — | 0.18 | 26% | 73% | 2-4 | x |

INDUSTRIAL APPLICABILITY

The present invention is applicable as fibrous cellulose-containing materials, fibrous cellulose composite resins, and a method for preparing a fibrous cellulose-containing material. For example, the fibrous cellulose composite resins may be applicable to interior materials, exterior materials, structural materials, and the like of transport equipment, such as vehicles, trains, vessels, and airplanes; casings, structural materials, internal components, and the like of electronic appliances, such as personal computers, televisions, telephones, and clocks; casings, structural materials, internal components, and the like of mobile communication equipment, such as mobile phones; housings, casings, structural materials, internal components, and the like of mobile music reproduction equipment, video reproduction equipment, printing equipment, copying equipment, sports goods, office equipment, toys, and the like; interior materials, exterior materials, structural materials, and the like of buildings, furniture, and the like; business equipment, such as stationaries and the like; and packages, containers like trays, protection members, partition members, and various others.

The invention claimed is:

1. A fibrous cellulose-containing material for addition to resin, comprising:

fibrous cellulose having an average fiber width of 0.1 to 19 μm and having hydroxyl groups partially or fully substituted with carbamate groups, 14% or more of the fibrous cellulose having a fiber length of 0.2 to 0.6 mm, and interactive powder that is interactive with the fibrous cellulose, wherein the interactive powder is an acid-modified resin, and a ratio of 90% particle size of the interactive powder to 10% particle size of the interactive powder is 10 to 200, wherein an amount of the interactive powder is 10 to 900 mass % of an amount of the fibrous cellulose.

2. The fibrous cellulose-containing material according to claim 1, wherein the interactive powder has a volume average particle size of 0.01 to 10000 μm, and a ratio of the volume average particle size in micrometer of the interactive powder to an average fiber length in micrometer of the fibrous cellulose is 0.005 to 5000.

3. The fibrous cellulose-containing material according to claim 1, wherein 5% or more of the fibrous cellulose has a fiber length below 0.2 mm.

4. The fibrous cellulose-containing material according to claim 1, wherein the fibrous cellulose has an average fiber length of 1.0 mm or shorter, an average fiber width of 10 μm or shorter, and a percentage of fibrillation of 2.5% or higher.

5. The fibrous cellulose-containing material according to claim 1, wherein the acid-modified resin powder has an acid value of 0.5 to 100 mgKOH/g.

6. The fibrous cellulose-containing material according to claim 1, wherein the interactive powder is maleic anhydride-modified polypropylene powder.

7. A fibrous cellulose composite resin comprising fibrous cellulose and resin mixed together, wherein the fibrous cellulose is a fibrous cellulose-containing material, comprising: fibrous cellulose having an average fiber width of 0.1 to 19 μm and having hydroxyl groups partially or fully substituted with carbamate groups, 14% or more of the fibrous cellulose having a fiber length of 0.2 to 0.6 mm, and interactive powder that is interactive with the fibrous cellulose, wherein the interactive powder is an acid-modified resin, and a ratio of 90% particle size of the interactive powder to 10% particle size of the interactive powder is 10 to 200, wherein an amount of the interactive powder is 10 to 900 mass % of an amount of the fibrous cellulose.

8. A method for preparing a fibrous cellulose-containing material, comprising:

defibrating fibrous cellulose having hydroxyl groups partially or fully substituted with carbamate groups to have an average fiber width of 0.1 to 19 μm and such that 14% or more of the fibrous cellulose has a fiber length of 0.2 to 0.6 mm, and mixing with interactive powder that is interactive with the fibrous cellulose so that an amount of the interactive powder is 10 to 900 mass % of an amount of the fibrous cellulose, to obtain a mixed liquid, the interactive powder being an acid modified resin, and a ratio of 90% particle size of the interactive powder to 10% particle size of the interactive powder is 10 to 200, and drying the mixed liquid.

9. The fibrous cellulose-containing material according to claim 1, wherein an arithmetic standard deviation of particle size of the interactive powder is 10 to 1000 μm.

* * * * *